Oct. 7, 1958  R. J. MERRITT  2,854,918
ROTISSERIE FOR KITCHEN RANGES
Filed Aug. 29, 1955
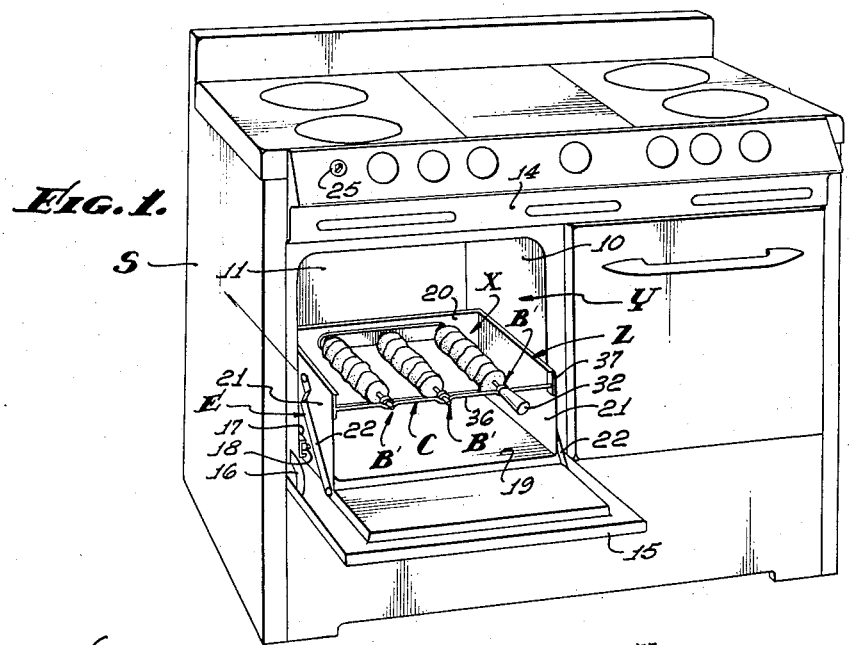
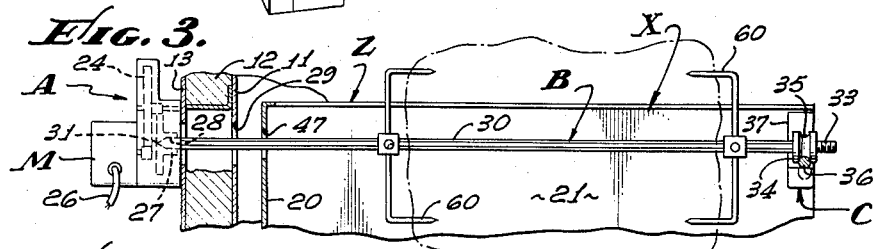
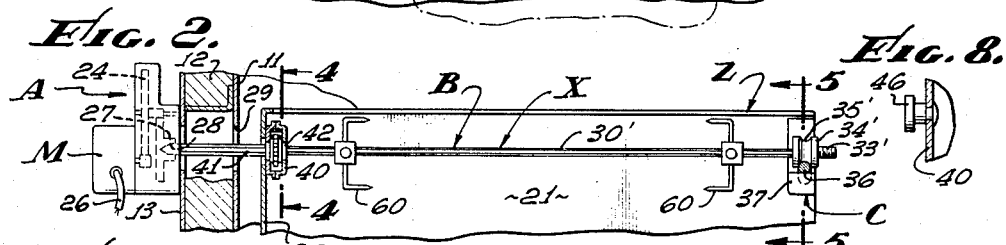
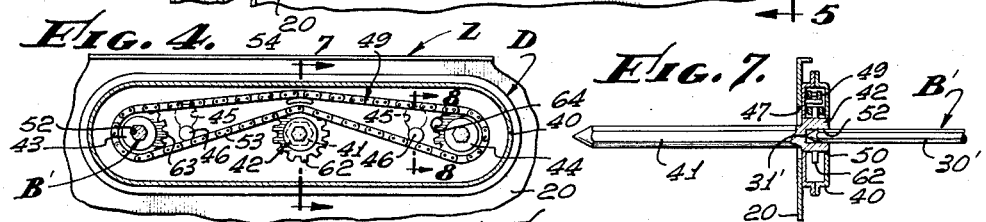
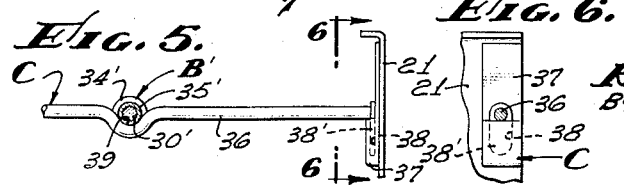
INVENTOR
ROBERT J. MERRITT
BY
Maxwell & Maxwell
AGENTS.

United States Patent Office 2,854,918
Patented Oct. 7, 1958

2,854,918
ROTISSERIE FOR KITCHEN RANGES

Robert J. Merritt, San Marino, Calif., assignor to O'Keefe & Merritt Company, Los Angeles, Calif., a corporation of California Application August 29, 1955, Serial No. 531,041

4 Claims. (Cl. 99—337)

This invention relates to a rotisserie for kitchen ranges and the like and is particularly concerned with the roasting of foods while being rotatably carried on a skewer or spit. It is a general object of this invention to provide a rotisserie unit involving one or more rotating skewers or spits and which is combined with the roasting compartment of a range or stove to be easily operated and wherein the food to be roasted is easily handled.

The roasting of foods, especially meats of various kinds, may be accomplished in many ways, a very desirable method being to support the meat on a skewer or spit and to rotate the meat over or under a fire or bed of coals, or near any other suitable source of heat. Rotisseries have been provided to carry out such methods of cooking or roasting and include motor driven skewers or spits which continuously rotate so that the meat is evenly roasted with the juices sealed therein. When employing the roasting compartment either the oven or broiler of an ordinary kitchen stove for housing the elements of a rotisserie there arises the problem of gaining access to the food or meat being roasted. That is, a person must be able to place the meat in the oven or broiler and remove it therefrom without burning his arms or hands. Further, the oven or broiler and the rotisserie elements should be versatile and able to handle various foods and different sizes and cuts of meats.

An object of this invention is to provide a rotisserie for the roasting compartment of a stove such as an oven or broiler compartment which is practical and easy to use in order to roast varying sizes and cuts of meat or the like.

Another object of this invention is to provide a rotisserie of the type above referred to that shifts into and out of the roasting compartment of the stove to be easily accessible to apply or remove food or meat therefrom.

It is still another object of this invention to provide a drive for rotating one or more skewers or spits either singly or together in unison as circumstances require.

A further object of this invention is to provide a cheap and inexpensive construction for the roasting compartment of a stove which is easily and quickly convertible to various uses as circumstances require.

The various objects and features of my invention will be fully understood from the following detailed description of a typical preferred form and application of my invention, throughout which description reference is made to the accompanying drawings, in which:

Fig. 1 is a perspective view of a stove embodying the rotisserie that I have provided. Fig. 2 is an enlarged detailed sectional view of a portion of the stove and rotisserie shown in Fig. 1. Fig. 3 is a view similar to Fig. 2 showing a modified form of construction. Fig. 4 is an enlarged detailed view taken as indicated by line 4—4 on Fig. 2. Fig. 5 is an enlarged detailed view of a portion of the structure taken as indicated by line 5—5 on Fig. 2. Fig. 6 is a detailed view taken as indicated by line 6—6 on Fig. 5. Fig. 7 is a transverse sectional view of a portion of the structure taken as indicated by line 7—7 on Fig. 4, and Fig. 8 is a sectional view of a portion of the structure taken as indicated by line 8—8 on Fig. 4.

The rotisserie X of the present invention is particularly adapted to use in connection with stoves and the like and involves the use of a roasting compartment Y. The roasting compartment Y may be an ordinary oven or broiler fired by gas burners or heated in any other suitable manner as by electrical heating elements. As shown, the compartment Y is a broiler in which case the heating means may be located at the top of the compartment.

The rotisserie X further includes the use of a movable frame or a drawer Z that is shiftable into and out of the roasting compartment Y and involves generally a drive A carried by the wall of the compartment Y, a skewer B, engageable with the drive A, a support C for the skewer and adapted to carry the outer end portion of the skewer, and a transmission D adapted to engage with the drive A and to drive a plurality of skewers or spits B' which may be employed in place of the skewer B and supported by the support C. With the structure that I have provided, a single skewer B may be used and driven alone by the drive A to handle a single piece of meat while the transmission D may be used if so desired to drive a plurality of spits B' in order to handle a plurality of pieces of meat.

The roasting compartment Y is characterized by flat walls of sheet metal or the like including side walls 10 and a back wall 11. The walls 10 and 11 may be insulated with a layer of suitable insulating material 12 held in place by a second or outer wall 13 provided for that purpose. The walls 10 and 11, etc., combine to form the compartment Y that opens at the front 14 of the stove S where it is closed by a door 15 carried on hinges 16. As shown, the door 15 is hinged at its lower edge on a horizontal axis so that it opens forwardly and downwardly. The hinges 16 are preferably designed to stop the door 15 in a horizontal position when opened as clearly illustrated in Fig. 1 of the drawings. The door 15 like the walls of the compartment Y may be formed of inner and outer walls of sheet metal or the like with a layer of suitable insulating material therebetween.

The movable frame or drawer Z is a shiftable element that is movably carried in the compartment Y and is mounted to be removable from the roasting compartment, partly at least. That is, the drawer Z may be any tray or rack-like element and in the preferred form of the invention, the drawer Z is shifted from within the compartment Y to project partly from the compartment and from the front 14 of the stove S. As indicated in the drawings, a track 17 is provided, one at each side wall 10 of the compartment, and there are rollers 18 operable in the tracks to support the drawer Z for rolling engagement in the roasting compartment. The drawer Z involves generally a bottom 19 for catching drippings from the food being roasted, a back 20 and sides 21. The bottom 19 is positioned adjacent the bottom of the compartment Y while the back 20 and sides 21 are of limited vertical extent and terminate at a point spaced substantially downward from the top of the compartment Y.

As clearly shown in Fig. 1 of the drawings, there is provided means for causing shifting of the drawer Z between the normal in position and the out or extended position shown. The means E is preferably in the form of a simple coupling element and involves a link 22, there being one link at each side of the door 15. Each link is pivotally connected at its ends to the drawer Z and to the door 15 and is connected to the door 15 at a point removed from the hinged axes thereof so that when the door 15 is opened the link 22 pulls the drawer Z to an extended position, and so that when the door 15 is closed the link 22 pushes the drawer Z to said normal operating position. It will be apparent that the drawer Z is shifted by means E under control or movement of the door 15.

The drive A that I have provided in order to rotate the skewer B or spits B' as the case may be, is preferably an electric motor drive and involves a motor M carried by the rear wall 11 of the compartment Y, a suitable reduction gear drive 24 or the like, and a control switch 25. As shown, the motor M and gear drive 24 form a unit that is adapted to have driving engagement with the skewer B or transmission D as hereinafter described, the motor M being energized through a line 26 under control of the switch 25 that may be located at the front 14 of the stove S. The gear drive 24 may be employed to gain the desired power and speed of rotation and is provided with a drive member 27 having a keyed opening 28 such as a polygonal socket type opening. In practice, the drive A is located at the back of the compartment Y on the exterior of the wall 13, and a passage 29 is provided through the wall 11 and wall 13 and the insulating layer 12 in order to pass the inner end of the skewer B or a part of the transmission D for driving engagement in the opening 28.

The skewer B is a straight elongate element for carrying the food or meat to be roasted and is adapted to be driven and rotated by the drive A. As shown, the skewer B is substantially coextensive with the drawer Z to extend longitudinally thereof and is sharpened at its inner end in order to easily pierce the food or meat. The skewer B is key shaped or polygonal in cross section at its inner end portion to fit into and have driving engagement with the opening 28 of the drive A, and is preferably of polygonal cross section throughout its length. For example, and as shown, the skewer B is made of a hexagonal bar 30 having a sharpened point 31 at its inner end. The outer end of the bar 30 terminates at the front of the drawer Z just inside the door 15 where it is threaded at 33 to releasably receive a removable handle. It will be apparent that a handle 32 may be threaded onto the bar 30 thereby providing an extension in order to facilitate manipulation of the skewer B. I have shown a typical handle 32 in Fig. 1 of the drawings. In addition to the foregoing, the skewer B carries a bearing sleeve 34 at the outer end portion just inward from the threaded portion 33. The sleeve 34 is fixed on the bar 30 and is provided with a continuous peripheral channel or groove 35 adapted to engage with the support C hereinafter described in order to hold the skewer B in operating position longitudinally of the drawer Z.

The support C for carrying the outer ends of the skewer B or spits B' as the case may be is carried by the drawer Z at the forward end thereof and extends horizontally and transversely of the drawer between the sides 21 and at a point spaced above the bottom 19. The support C may involve a simple rod 36 of material round in cross section with the opposite side ends thereof engaged in brackets 37 carried at the side walls 21 of the drawer Z. The brackets 37 may be of any suitable construction and each is formed with an upwardly opening pocket 38 adapted to slidably receive a downwardly projecting lug 38' at the end of the bar 36.

At the center of the rod 36 and at the other suitable intervals along the rod 36, indentations or recesses 39 are formed depending upon the spacing and number of skewers and/or spits to be supported. As illustrated, there is one recess 39 at the center of the rod and one recess 39 at each side of the center recess all equally spaced and each adapted to rotatably support a skewer or spit. The recesses may be formed by deflecting portions of the rod 36 downwardly in a manner to rotatably engage with the sleeve 34 of the skewer B or with the sleeve 34' of the spit B'.

The spits B' may be identical with the skewer B with the exception that they may be made somewhat shorter in order to be accommodated by the transmission D hereinafter described. As shown in Figs. 1 and 2 of the drawings, the spits B' are formed of rods 30' with sharpened inner ends 31' and threaded outer end portions 33' to releasably receive a removable handle 32. Each of the spits B' has a sleeve 34' with a groove 35' adapted to be rotatably carried by a recess in the support C.

It will be apparent from the construction thus far described that skewer B may be entered into the opening 28 of the drive A with the sleeve 34 rotatably carried by the support C to the end that the skewer is driven or rotated in operating position when the drawer Z has been moved to the closed position where the skewer is moved rearwardly or inwardly to have driving engagement with the drive A.

The transmission D is provided to adapt the drive A to handle a plurality of skewers or spits B' and as shown involves, generally, a housing 40, a driving shaft 41, spaced driving hubs 42, 43, and 44, and a drive 49 between the hub 42 and hubs 43 and 44. The housing 40 may be permanently carried by the drawer Z. However, the housing 40 is releasably secured to the back 20 of the drawer Z preferably by means of slotted connections, each involving a keyhole slot 45 and a shouldered connecting pin 46. The slot 45 is shown formed in the back 20 of the drawer, there being a pair of laterally spaced slots 45 while the pin 46 projects rearwardly from the housing 40 to engage in the slots. The upper portions of the slots are enlarged so that the pins 46 can be entered therein and so that the housing can then be shifted downwardly to be connected to the back of the drawer.

The drive shaft 41 projects rearwardly from the housing 40 and is rotatably carried in the housing by the hub 42 and is key shaped or polygonal in cross section corresponding to the shape of the skewer B. The shaft 41, and skewer B, project through an opening 47 in the back 20 intermediate the slots 45 and is aligned with the drive A to be engaged in the opening 28. When the drawer Z is moved forwardly, the shaft 41 disengages from the opening 28 and when the drawer Z is moved rearwardly to the operating position, the shaft 41 is engaged in the opening 28 to have driving connection therewith.

The hubs 43 and 44 are laterally spaced one at each side of the drawer on spaced parallel axes that extend longitudinally thereof. Each of the hubs is rotatably carried in the walls of the housing 40 on spaced bearings 50 and each is provided with supporting and driving openings 52 that are key shaped or polygonal in cross section such as the opening 28 above described. As shown, the spits B' are hexagonal in cross section and have driving engagement with the openings 52.

The drive 49 may be a belt or gear drive and as illustrated, involves a chain 53 engaged with a gear 62 on the hub 42 and driving gears 63 and 64 on the hubs 43 and 44, respectively. A guide 54 is provided to handle and properly space portions of the chain 53 so that they cannot interfere with each other.

From the foregoing, it will be apparent that I have provided a structure adapted to handle and rotate a skewer B or to handle and rotate one or more of a plurality of skewers or spits B'. The skewer B and spits B' are easily handled and each is adapted to pierce and support a piece of food such as meat or the like. As shown in Figs. 2 and 3 of the drawings, driving forks 60 may be provided which are slidably carried longitudinally of the skewers and/or spits and which are set in place by means of suitable thumb screws or set screws as desired. When large pieces of food are to be roasted, one single skewer B may be employed or the two outer spits may be used. It will be apparent that when employing two spits, the size of the food to be roasted is somewhat limited and that when the third or central spit is employed, the size of the food to be roasted is further limited. With the structure provided, it is a simple matter to apply the handle 32 or to remove it, and it is easy to apply or remove the transmission D from the drawer A. When the drawer Z is shifted forwardly by opening of the door 15, the skewers and foods are accessible, and when the drawer Z is moved back into operating position by closing of the door 15, the skewers are automatically engaged with the drive A to be rotated thereby.

Having described only a typical preferred form and application of my invention, I do not wish to be limited or restricted to the specific details herein set forth, but wish to reserve to myself any variations or modifications that may appear to those skilled in the art and fall within the scope of the following claims Having described my invention, I claim:

1. A rotisserie for the roasting compartment of a stove having a hinged door including, a motor drive carried on the back wall of the compartment and having a drive shaft with a polygonal socket accessible from within the compartment, a drawer-like element having a horizontally disposed bottom, vertical side and back walls and an open front shiftably carried in the compartment between an in or operating position and an out or extended position, coupling means between the door and the element whereby the element is shifted to and from its out position as the door is opened and closed, a transmission carried by the back wall of the element and having a rearwardly projecting polygonal shaft in the socket in the drive shaft when the element is in said operating position, said transmission having a plurality of laterally spaced hubs with polygonal openings therein, and a plurality of elongate, horizontally disposed and laterally spaced polygonal spits rotatably supported by the element and engaged in the openings in the hubs and driven in unison by said transmission.

2. A rotisserie for the roasting compartment of a stove having a hinged door including, a motor drive carried on the back wall of the compartment and having a drive shaft with a polygonal socket accessible from within the compartment, a drawer-like element having a horizontally disposed bottom, vertical side and back walls and an open front shiftably carried in the compartment between an in or operating position and an out or extended position, coupling means between the door and the element is shifted to and from its out position as the door is opened and closed, a lateral support at the open forward end of the element and having laterally spaced recesses therein, a transmission, means releasably securing the transmission to the back wall of the element, said transmission having a rearward projecting polygonal shaft engaged in the socket in the drive shaft when the element is in said operating position and having a plurality of laterally spaced driving hubs with polygonal openings aligned with said recesses, and a plurality of laterally spaced polygonal spits rotatably supported in the recesses and engaged in the openings in the hubs and driven in unison by said transmission, said means including laterally spaced keyed openings in back wall of the elongate and laterally spaced shoulder pins on the transmission and engaged in the openings.

3. A rotisserie for the roasting compartment of a stove having a hinged door including, a motor drive carried on the back wall of the compartment and having a drive shaft with a polygonal socket accessible from within the compartment, a drawer-like element having a horizontally disposed bottom, vertical side and back walls and an open front shiftably carried in the compartment between an in or operating position and an out or extended position, coupling means between the door and the element is shifted to and from its out position as the door is opened and closed, a lateral support at the open forward end of the element with legs releasably engaged in brackets carried by the element and having laterally spaced recesses therein, a transmission, means releasably securing the transmission to the back wall of the element, said transmission having a rearwardly projecting polygonal shaft engaged in the socket in the drive shaft when the element is in said operating position and having a plurality of laterally spaced driving hubs with polygonal openings aligned with said recess, and a plurality of laterally spaced polygonal spits rotatably supported in the recesses and driven in unison by said transmission, said means including laterally spaced keyed openings in back wall of the elongate and laterally spaced shoulder pins on the transmission and engaged in the openings.

4. A rotisserie for the roasting compartment of a stove having a hinged door including, a motor drive carried on the back wall of the compartment and having a drive shaft, an element having longitudinally disposed sides and a transverse back shiftably carried in the compartment between an in or operating position and an out or extended position, coupling means between the door and the element whereby the element is shifted to and from its out position as the door is opened and closed, a transmission mounted on the back of the element with a rearwardly projecting driven shaft, a drive coupling means including separable coupling members, one of said members carried by said drive shaft and accessible from within the compartment, the other of said members carried by said driven shaft, said members being in driving engagement when the element is in said operating position, and a spit rotatably supported by the element and engaged with and driven through said transmission.

References Cited in the file of this patent

UNITED STATES PATENTS

| | | |
|---|---|---|
| 1,718,961 | Humphrey | July 2, 1929 |
| 2,330,132 | Martin et al. | Sept. 21, 1943 |
| 2,536,630 | Elmer | Jan. 2, 1951 |
| 2,577,963 | Hagopian | Dec. 11, 1951 |
| 2,588,046 | Ridgely | Mar. 4, 1952 |
| 2,633,841 | Jenson et al. | Apr. 7, 1953 |